United States Patent
Chiu (10) Patent No.: US 9,816,559 B2
(45) Date of Patent: Nov. 14, 2017

(54) LINEAR GUIDEWAY WITH A SELF-LUBRICATING ASSEMBLY

(71) Applicant: OME TECHNOLOGY CO., LTD., New Taipei (TW)

(72) Inventor: Yi-Chien Chiu, New Taipei (TW)

(73) Assignee: OME TECHNOLOGY CO., LTD., New Taipei (TW)

( * ) Notice: Subject to any disclaimer, the term of this patent is extended or adjusted under 35 U.S.C. 154(b) by 42 days.

(21) Appl. No.: 15/047,696

(22) Filed: Feb. 19, 2016

(65) Prior Publication Data

US 2017/0097047 A1    Apr. 6, 2017

(30) Foreign Application Priority Data

Oct. 2, 2015  (TW) .............................. 104215831 U (51) Int. Cl.
*F16C 29/06* (2006.01)
*F16C 33/66* (2006.01)
*F16C 29/04* (2006.01)

(52) U.S. Cl.
CPC .......... *F16C 33/6685* (2013.01); *F16C 29/04* (2013.01); *F16C 33/6648* (2013.01); *F16C 33/6659* (2013.01)

(58) Field of Classification Search
CPC ...... F16C 29/04; F16C 29/06; F16C 29/0609; F16C 29/0635; F16C 29/0638; F16C 29/064; F16C 29/0645; F16C 29/0647; F16C 29/065; F16C 29/0651; F16C 29/0654; F16C 29/0657; F16C 29/0659; F16C 29/0661; F16C 29/0664; F16C 29/0666; F16C 29/0669; F16C 29/0671; F16C 29/0673; F16C 33/6611; F16C 33/6648; F16C 33/6659; F16C 33/6674
See application file for complete search history.

(56) References Cited

U.S. PATENT DOCUMENTS

| | | | | |
|---|---|---|---|---|
| 6,082,899 A | * | 7/2000 | Suzuki | F16C 29/0609 184/5 |
| 6,257,766 B1 | * | 7/2001 | Agari | F16C 29/0609 384/15 |
| 6,290,394 B1 | * | 9/2001 | Obara | B23Q 11/124 384/13 |

(Continued)

*Primary Examiner* — Phillip A Johnson
(74) *Attorney, Agent, or Firm* — Li&Cai Intellectual Property (USA) Office (57) ABSTRACT

A self-lubricating assembly for a linear guideway comprises two oil containers and at least a connector. Each of the oil containers has a body, at least one absorber, and a flexible lubricating element. A holding groove for accommodating the lubricant is formed inside the body, the outside of the body is formed with a rail contacting portion and a connecting portion. The absorber is disposed in the holding groove for sucking the lubricant. The flexible lubricating element is disposed firmly in the rail contacting portion, and at least a part of the flexible lubricating element is extended to the holding groove for sucking the lubricant. The diffusion velocity of the lubricant in the absorber is faster than the diffusion velocity of the lubricant in the flexible lubricating element. At least a connector connects the connecting portions of the oil containers, so the lubricant flows between the two oil containers.

14 Claims, 9 Drawing Sheets

(56) References Cited

U.S. PATENT DOCUMENTS

| | | | |
|---|---|---|---|
| 2002/0027044 A1* | 3/2002 | Michioka | B23Q 11/0875 184/5 |
| 2002/0039458 A1* | 4/2002 | Ishihara | F16C 29/06 384/45 |
| 2010/0111454 A1* | 5/2010 | Natale | F16C 29/0609 384/13 |

* cited by examiner

LINEAR GUIDEWAY WITH A SELF-LUBRICATING ASSEMBLY

BACKGROUND OF THE INVENTION

1. Field of the Invention

The present invention is related to a linear guideway and a self-lubricating assembly thereto.

2. Description of Related Art

The traditional linear guideway has a lubricating assembly disposed in a slide block. The lubricating assembly is mostly fixed in the slide block and moves with the slide block along the guideway, and the lubricant is applied on the guideway accordingly, so the slide block is smoothly moved along the guideway.

The user needs to fill the lubricating assembly with lubricant to make sure it works properly. However, it wastes time and is not convenient that the traditional lubricating assembly needs to be moved to the end of the guideway for replacement or adding the lubricant. In summary, the inventor of this instant disclosure has contributed to research and developed the linear guideway with a self-lubricating assembly of the instant disclosure to overcome the abovementioned drawbacks.

SUMMARY OF THE INVENTION

The object of the instant disclosure is to provide a linear guideway with a self-lubricating assembly to resolve the problem that the lubricating assembly can not replace or fill the lubricant quickly.

The self-lubricating assembly for linear guideway according to the present invention includes at least two oil containers and a connector. Each of the oil containers comprises a body, at least an absorber and a flexible lubricating element. The body is formed inward with a holding groove to reserve a lubricant, and outside of the body is formed with a rail contacting portion and a connecting portion. The absorber is disposed inside the holding groove for sucking the lubricant. The flexible lubricating element is disposed in the rail contacting portion, and at least a part of the flexible lubricating element is extended to the holding groove for sucking the lubricant. At least one connector is connected to the connecting portion of the oil container, so the lubricant flows between the two oil containers. The connecting portions of the two oil containers are selectively connected to the connector. The diffusion velocity of the lubricant in the absorber is faster than the diffusion velocity of the lubricant in the flexible lubricating element.

The present invention has the advantages that the two oil containers are connected to each other selectively, so the users can take the oil container apart quickly to repair or to fill the self-lubricating assembly with lubricant, and need not take out the oil container from two ends of the guideway.

DETAILED DESCRIPTION OF THE PREFERRED EMBODIMENTS

First Embodiment

Figure 1:
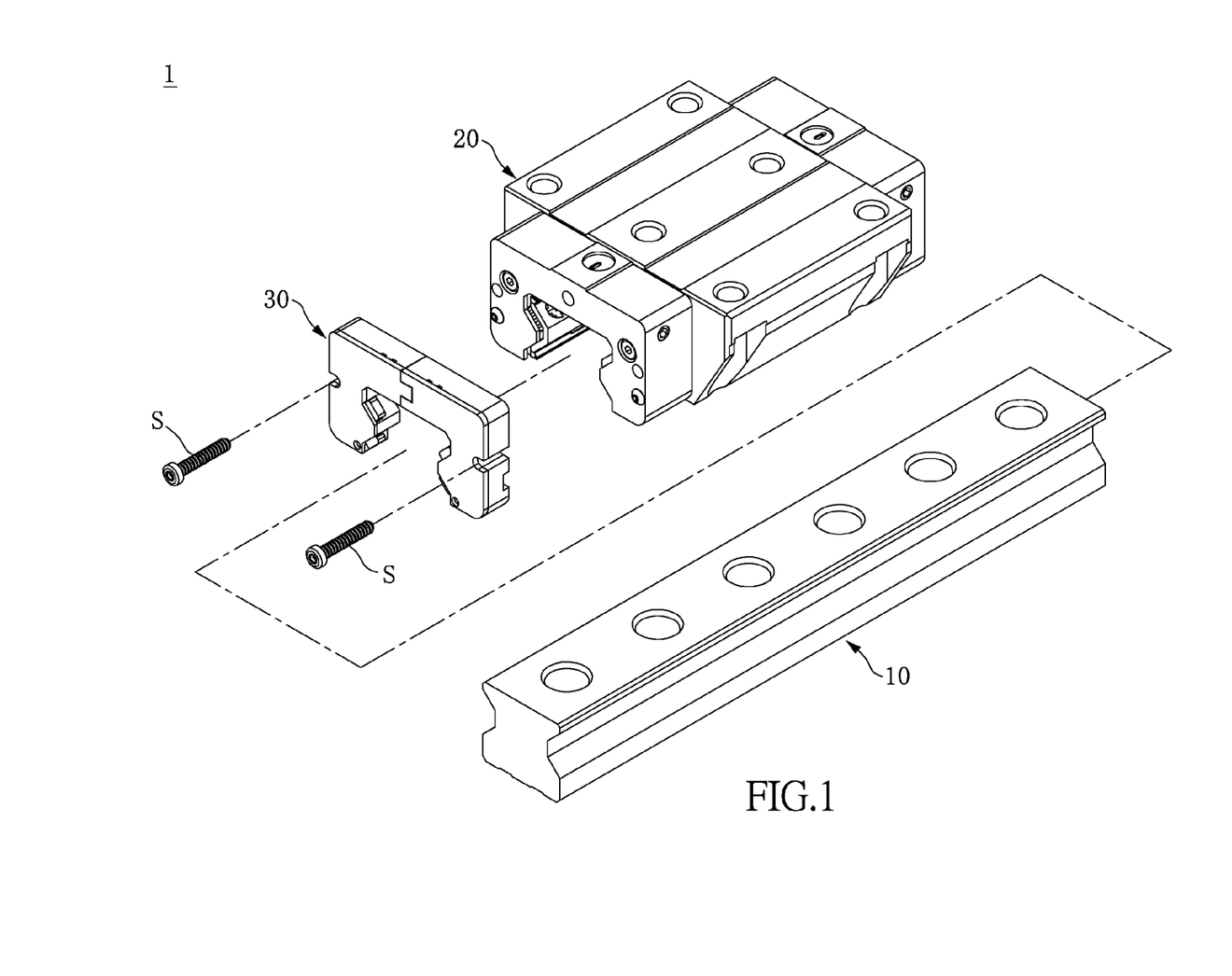
FIG. 1 illustrates an exploded view of a first embodiment of the instant disclosure.
Figure 2:
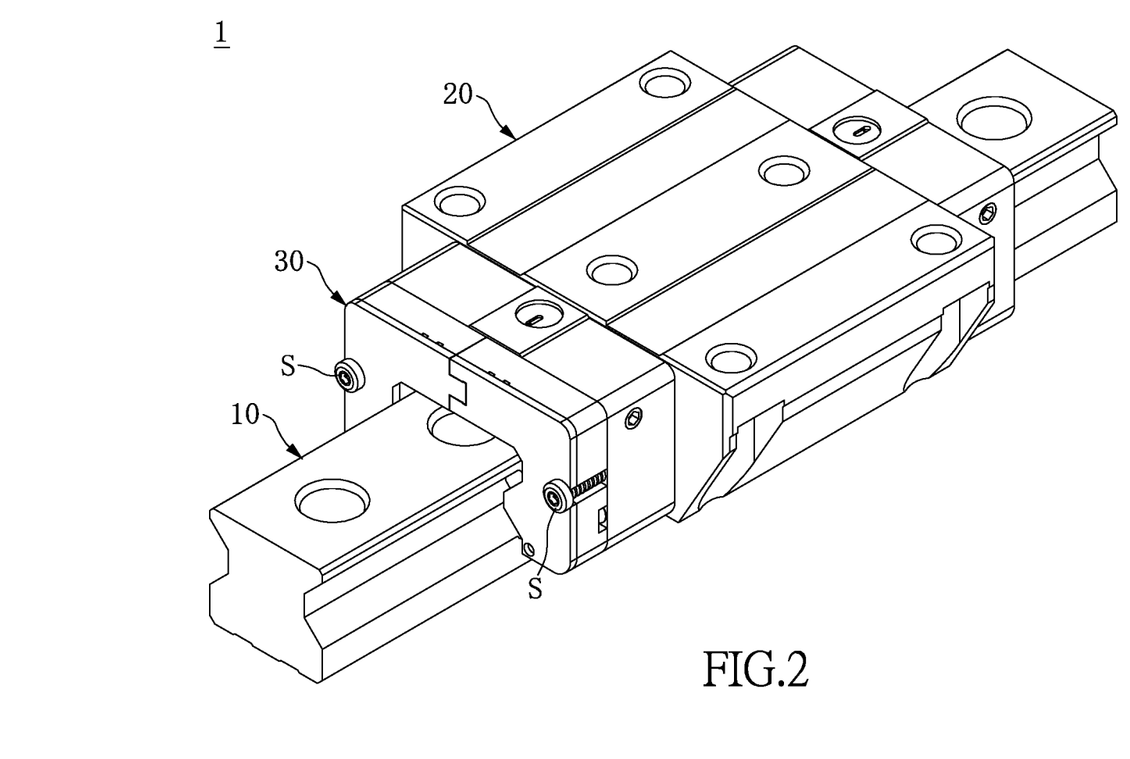
FIG. 2 illustrates a perspective view of a first embodiment of the instant disclosure.
Figure 3:
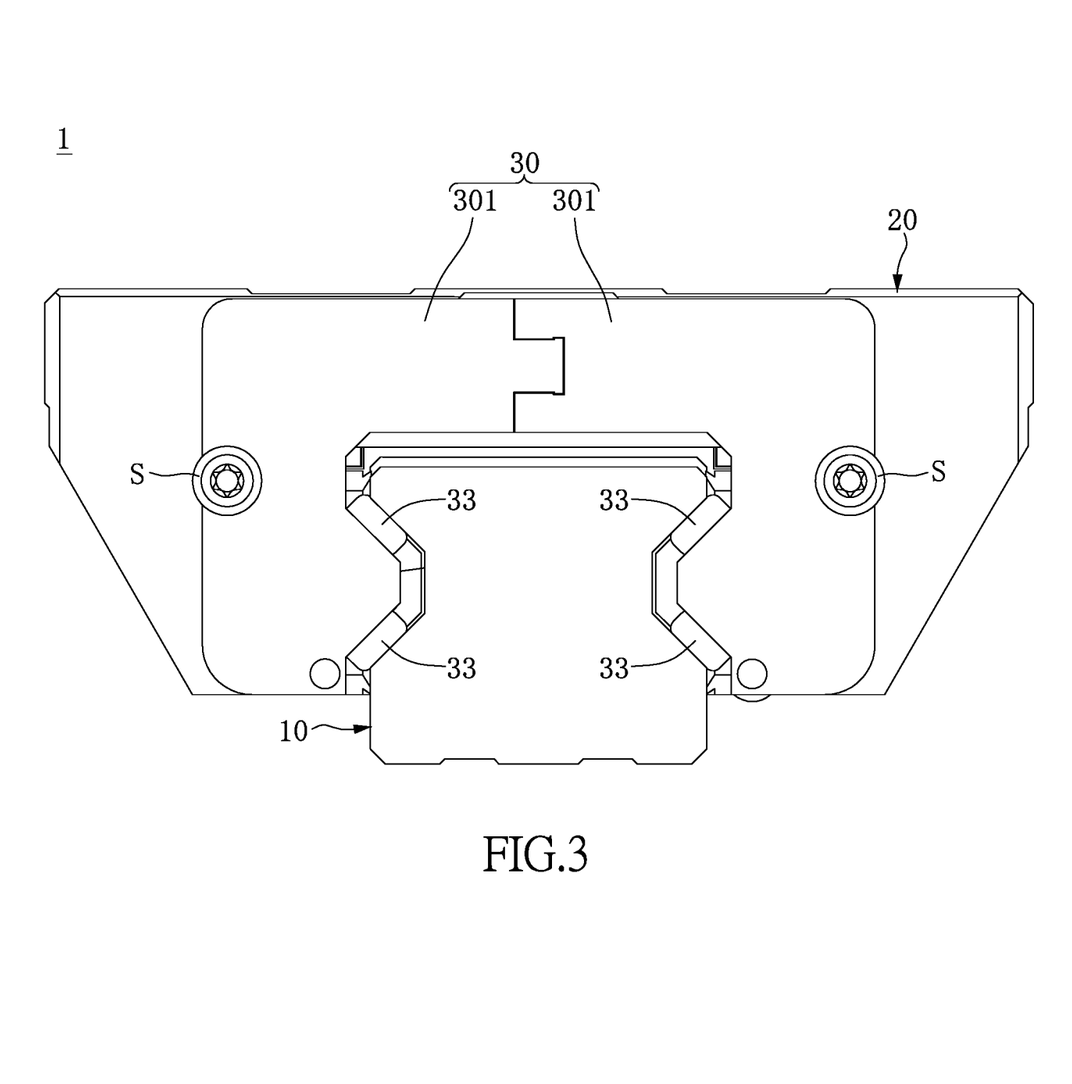
FIG. 3 illustrates a front view of a first embodiment of the instant disclosure.

With reference FIGS. 1 to 3, illustrating an exploded view, a perspective view of assembling, and a front view of a first embodiment in the instant disclosure, a linear guideway 1 includes a guideway 10, a slide block 20, roll components (not shown, e.g. roll ball, roll pillar) and a self-lubricating assembly. A plurality of roll components are disposed inside the slide block 20, so the slide block unit 20 is linearly movable along the guideway 10. The self-lubricating assembly 30 is fixed in one end of the slide block unit 20 through a plurality of positioning members S, and linearly movable along the guideway 10 with the slide block unit 20. More specifically, the slide block unit 20 includes a slide and two lids. The two lids are installed on two ends of the slide block, and the self-lubricating assembly is disposed in one of the two lids. The shape of the guideway 10 and the slide block unit 20 could be modified as required. The self-lubricating assembly 30 of the linear guideway 1 is explained as follows.

Figure 4:
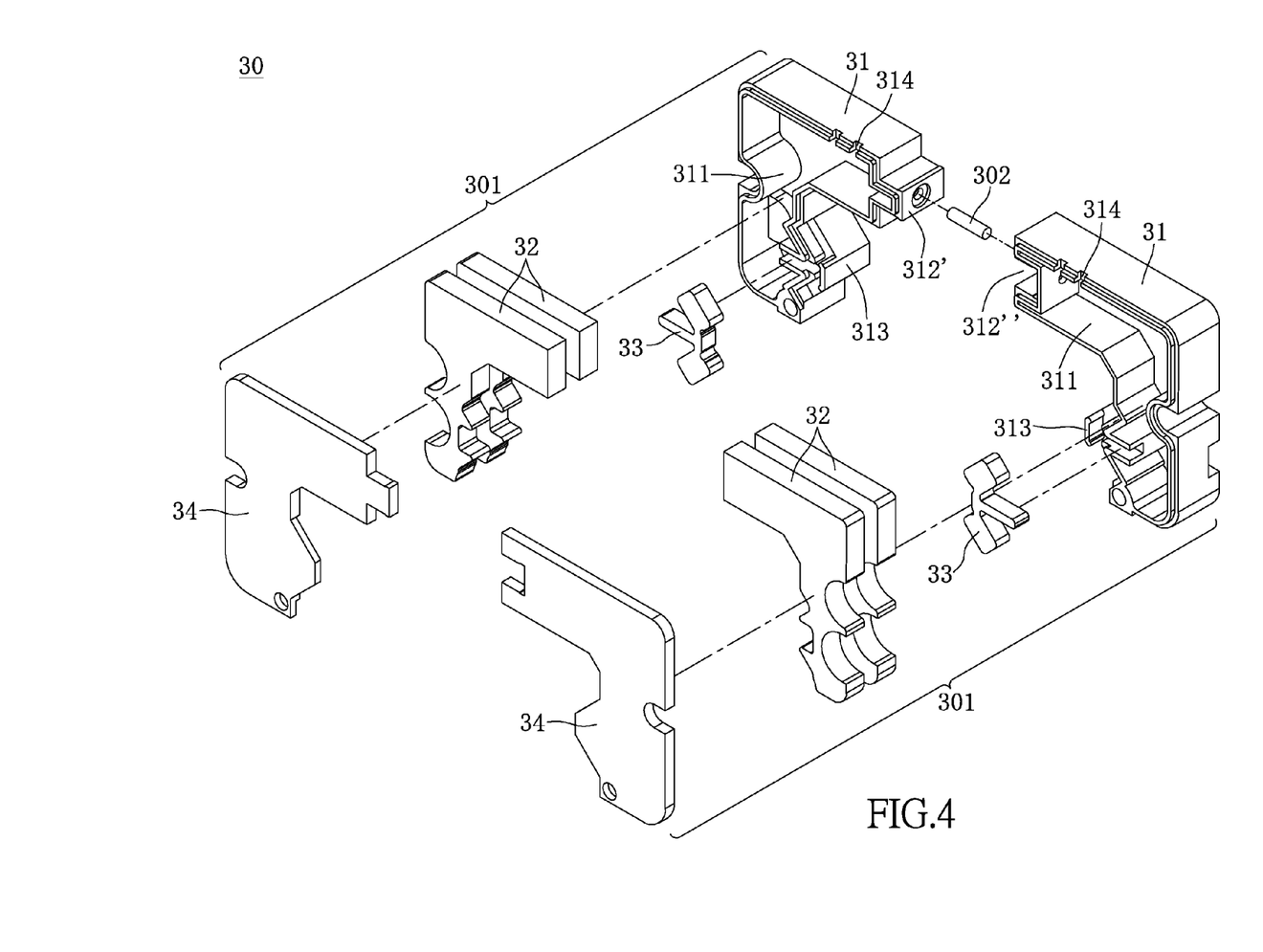
FIG. 4 illustrates an exploded view of the self-lubricating assembly of the first embodiment of the instant disclosure.
Figure 5:
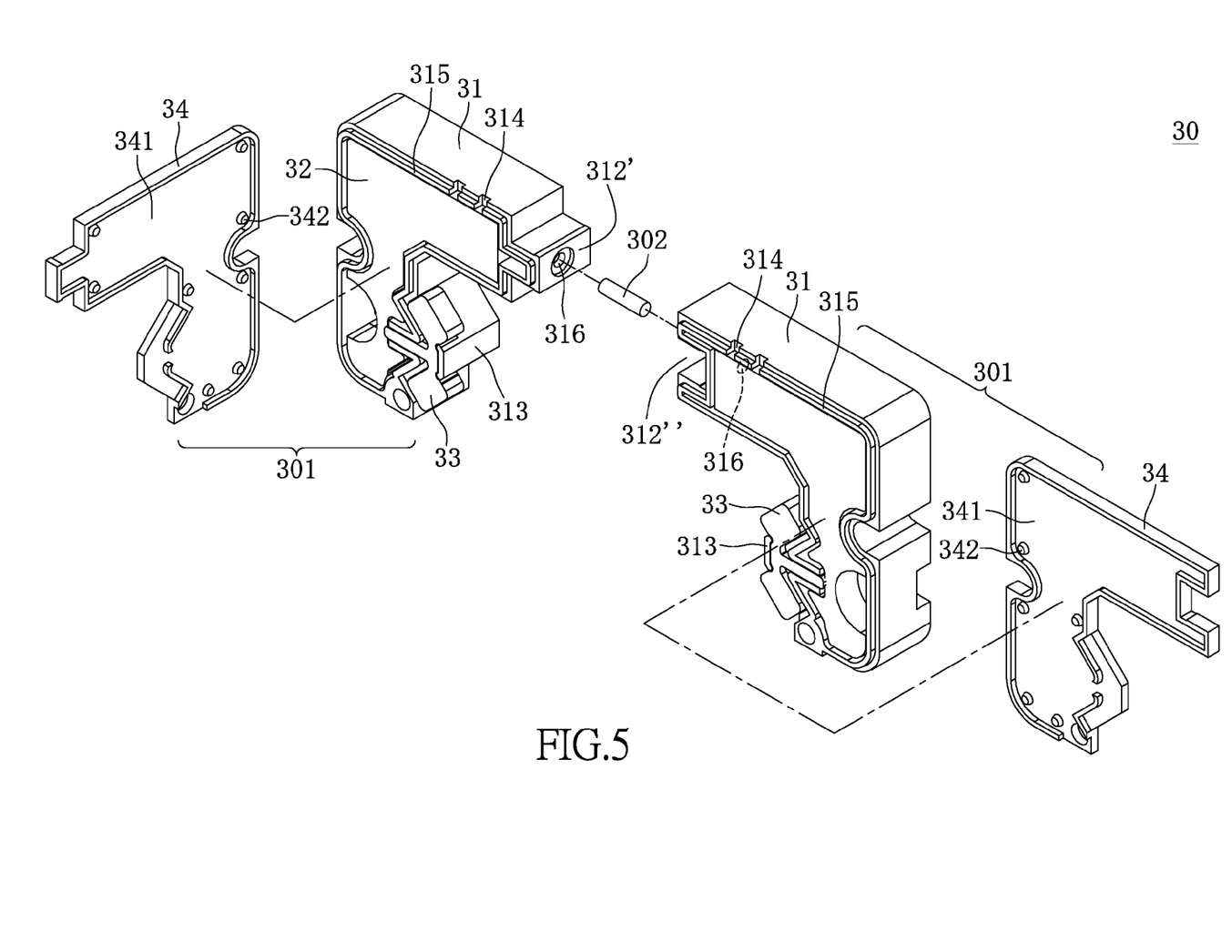
FIGS. 5-7 illustrate a perspective view of a first embodiment of the instant disclosure of showing that the self-lubricating assembly is to be assembled.
Figure 6:
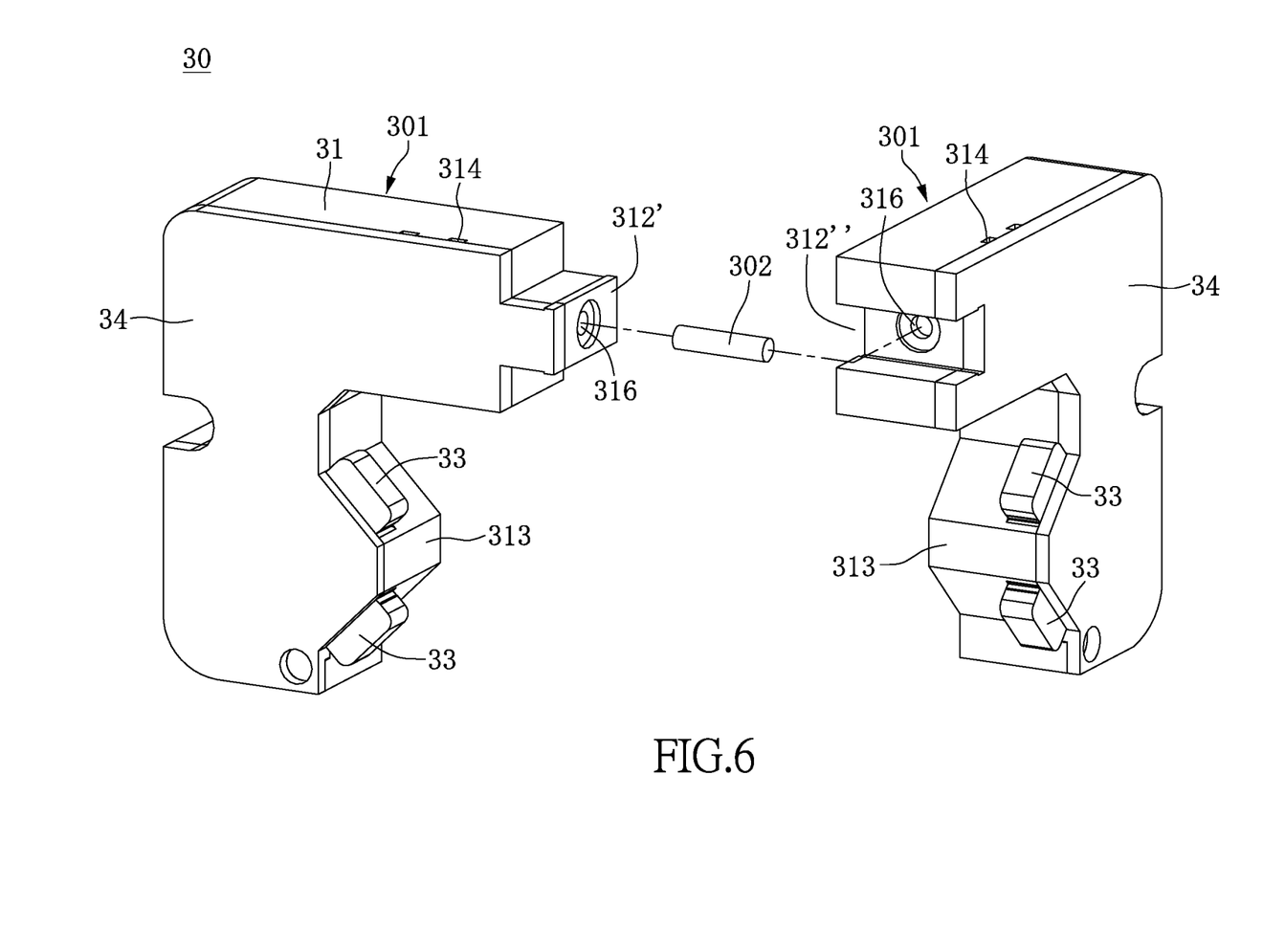

With reference FIGS. 4 to 6, illustrating an exploded view and a perspective view of assembling the first embodiment in the instant disclosure, the self-lubricating assembly 30 includes two oil containers 301 and a connector 302. Two oil containers 301 are engaged with each other. Each of the oil containers 301 has a body 31, two absorbers 32, a flexible lubricating element 33, and a cover 34. Two absorbers 32 are disposed inside the body 31. The flexible lubricating element 33 is fixed in the body 31, and a part of the flexible lubricating element 33 is exposed to the body 31. The cover 34 is engaged with the body 31, so the two absorbers 32 and part of the flexible lubricating element 33 are sealed inside the body 31. The connector 302 is disposed between the two oil containers 301, so the lubricant flows between the two oil containers 301, and the volume of lubricant of the two oil container 301 is balanced. With reference FIG. 3, the self-lubricating assembly 30 is disposed in the guideway 10, the flexible lubricating elements 33 of the two oil containers 301 contact both side of the guideway 10. The flexible lubricating elements 33 apply the lubricant onto the guideway 10 while the self-lubricating assembly 30 is moved along with the slide block unit 20.

The oil container 301 is explained in detail as follows.

Referring to FIG. 4, each of the oil containers 301 is formed with a holding groove 311 for accommodating the lubricant. The outside of the body 31 is formed with a connecting portion 312', 312", and a rail contacting portion 313. A position of the body 31 away from the rail contacting portion 313 is formed with two air vents 314, each of the two air vents 314 are penetrated through the body 31, so the holding groove 311 of the body 31 is connected to the outside. Specifically, as shown in the drawing, the rail contacting portion 313 of the body 31 is located below the body 31, and the two air vents 314 are located on the top side of the body 31. The configuration of the oil container 301 and body 31 could be modified according the slide block unit 20, and are not limited to the configuration shown in drawings.

The absorber 32 of each of the oil containers 301 is disposed in the holding groove 311 for sucking the lubricant accommodated in the holding groove 311. In practice, the absorber 32 is made of oil-absorbing cotton or foam, or materials capable of absorbing the liquid. Two absorbers 32 are arranged at regular interval in the holding groove 311 for sucking the lubricant in the holding groove 311. The numbers of the absorbers 32 is not limed to 2 and could be modified according to the volume of the holding groove 311. The configuration of the absorber 32 may be, but is not limited to, corresponding to the shape of the holding groove 311 as shown in drawings. The holding groove 311 could be formed with a plurality of pillars and the absorber 32 could be formed with corresponding holes, so the absorber 32 is secured within the holding groove 311.

The flexible lubricating element 33 of each oil container 301 is fixed in the rail contacting portion 313, and at least a part of the flexible lubricating element 33 is extended to the holding groove 311 for sucking the lubricant in the holding groove 311. The flexible lubricating element 33 is actually made of wool. The flexible lubricating element 33 is engaged with the rail contacting portion 313, and the shape of the flexible lubricating element 33 may be, but is not limited to the configuration shown in the drawings, and could be modified as required.

A part of flexible lubricating element 33 extended to the holding groove 311 contacts the absorber 32 disposed in the holding groove 311 for increasing the absorbing efficiency of the flexible lubricating element 33. The lubricant of the absorber 32 enters the flexible lubricating element 33 caused by the siphon effect when the lubricant of the flexible lubricating element 33 is relatively less than the lubricant of the absorber 32.

Preferably, the diffusion velocity of the lubricant in the absorber 32 is faster than the diffusion velocity of the lubricant in the flexible lubricating element 33. In other words, the lubricant sucking velocity of the flexible lubricating element 33 is slower than the lubricant sucking velocity of the absorber 32. The absorber 32 is sucked and unleashes the lubricant quickly, but the flexible lubricating element 33 is sucked and unleashes the lubricant with a relatively slower velocity, so the lubricant is applied on the guideway with a relatively slower velocity, and the absorber 32 fills the lubricant into the flexible lubricating element 33 with a relative faster velocity.

Referring to FIG. 5, the cover 34 of each of the oil containers 301 is detachable and disposed in one side adjacent to the holding groove 311 of the body 31. The cover 34 selectively seals the holding groove 311, so the absorber 32 and the lubricant accommodated in the holding groove 311 are not exposed. In this embodiment, the outside of the body 31 is formed with a flange 315 surrounding the holding groove 311. The cover 34 is formed with a flue 341 corresponding to the flange 315, so the cover 34 is engaged with the body 31 through the flue 341 and flange 315 for sealing the absorber 32 and lubricant accommodated in the holding groove 311.

Figure 8:
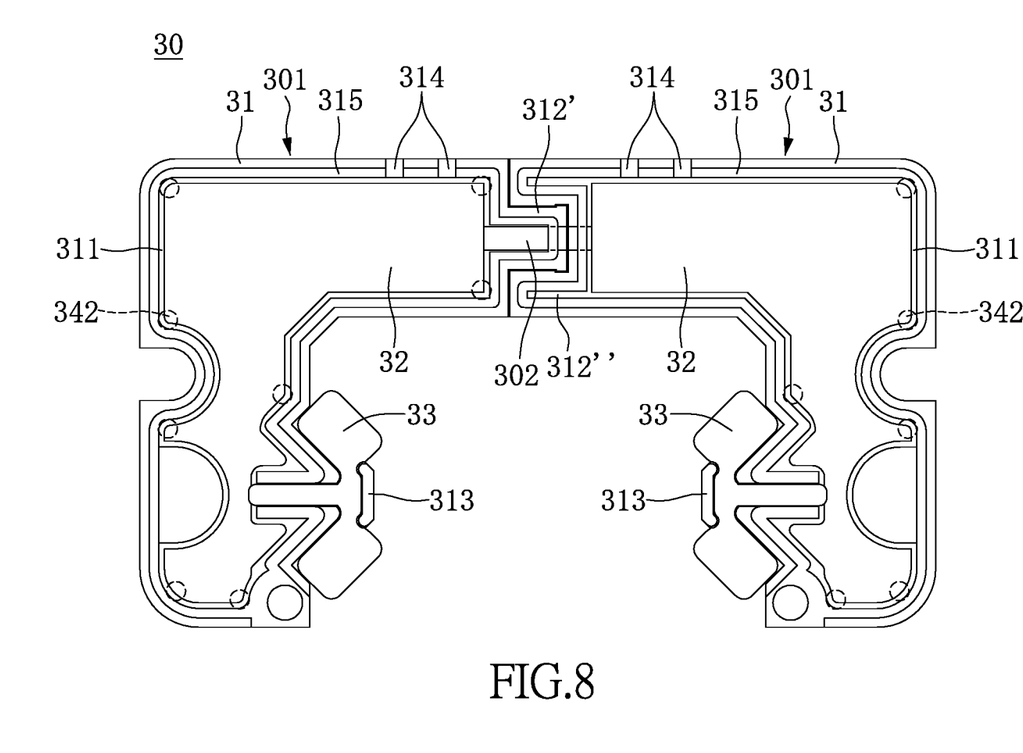
FIG. 8 illustrates a front view of a self-lubricating assembly of a first embodiment of the instant disclosure.

Referring to FIG. 5 and FIG. 8, in a preferable embodiment, one side of the cover 34 adjacent the flue 341 is formed with a plurality of pillars 342, and the diameter of each of the pillars 342 is decreased toward the direction away from the cover 34. The pillars 342 of the cover 34 correspond to the bending portion of the body 31 when the cover 34 is engaged with the body 31 to enhance the sealing effect between the cover 34 and the body 31.

Referring to FIG. 5 and FIG. 8, the connector 302 is a cotton rope disposed between punch hole 316 of the connecting portion 312' and 312". When the connecting portions 312', 312" are engaged with each other, two ends of the connector 32 are respectively disposed in the holding groove 311 of the two oil containers 301, so the lubricant is flows between the two oil containers 301 by the connector 302.

In a preferable embodiment, two ends of the connector 32 respectively contact the two absorbers 32 of the two oil containers 301. The lubricant of the absorber 32 of the oil container 301 flows to another absorber 32, so the volume of the lubricant of the flexible lubricating element 33 of the two oil containers 301 is adjusted, and an average amount of lubricant is applied to both sides of the guideway 10. The shape and the length of the connector 32 could be modified as required. For instance, the connector 32 is extended to the absorber 32.

Figure 7:
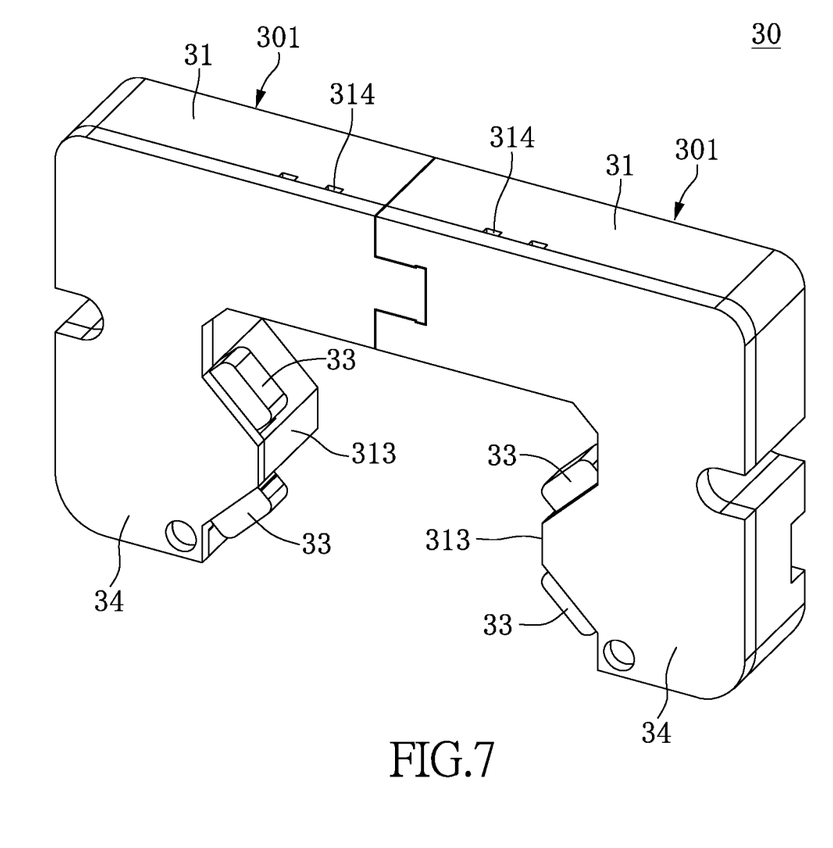

Referring to FIG. 6 and FIG. 7, the two connecting portions 312', 312" may be a buckle structure and so engage with each other quickly. More specifically, the connecting portion 312' of the oil container 301 is a projecting buckle structure, whereas another connecting portion 312" of the oil container 301 is an indenting buckle structure, so the two oil containers 301 are engaged with each other via the above-mentioned projecting buckle structure and indenting buckle structure. The connecting portions 312', 312" of the two oil containers 301 could be disassembled for the replacement of the self-lubricating assembly 30, and the self-lubricating assembly 30 could be detached from the guideway 10 accordingly, unlike the prior art, where the slide block needs to move to the end of the guideway for detaching the self-lubricating assembly.

In summary, referring to FIG. 3 and FIG. 8, the self-lubricating assembly 30 in the present invention is disposed on the guideway 10, and part of flexible lubricating element 33 is exposed from the rail contacting portion 313 of the oil container 301, and the exposed portions of the flexible lubricating element 33 correspond to opposite sides of the guideway 10. A non-exposed portion of the flexible lubricating element 33 contacts the absorber 32 disposed in the body 31. The absorbers 32 disposed in the two oil containers 301 are connected to the connector 32, so the flexible lubricating elements 33 of the two oil containers 301, the absorbers 32, and connector 302 form a loop of lubricant. The portions exposed from the two oil containers 301 of the flexible lubricating element 33 are filled with lubricant through the loop of lubricant, and apply the lubricant averagely to both sides of the guideway 10. In other words, the self-lubricating assembly 30 of the linear guideway 1 in the present invention provides fast replacement and assembly and is capable of applying the lubricant averagely to both sides of the guideway 10.

Second Embodiment

Figure 9:
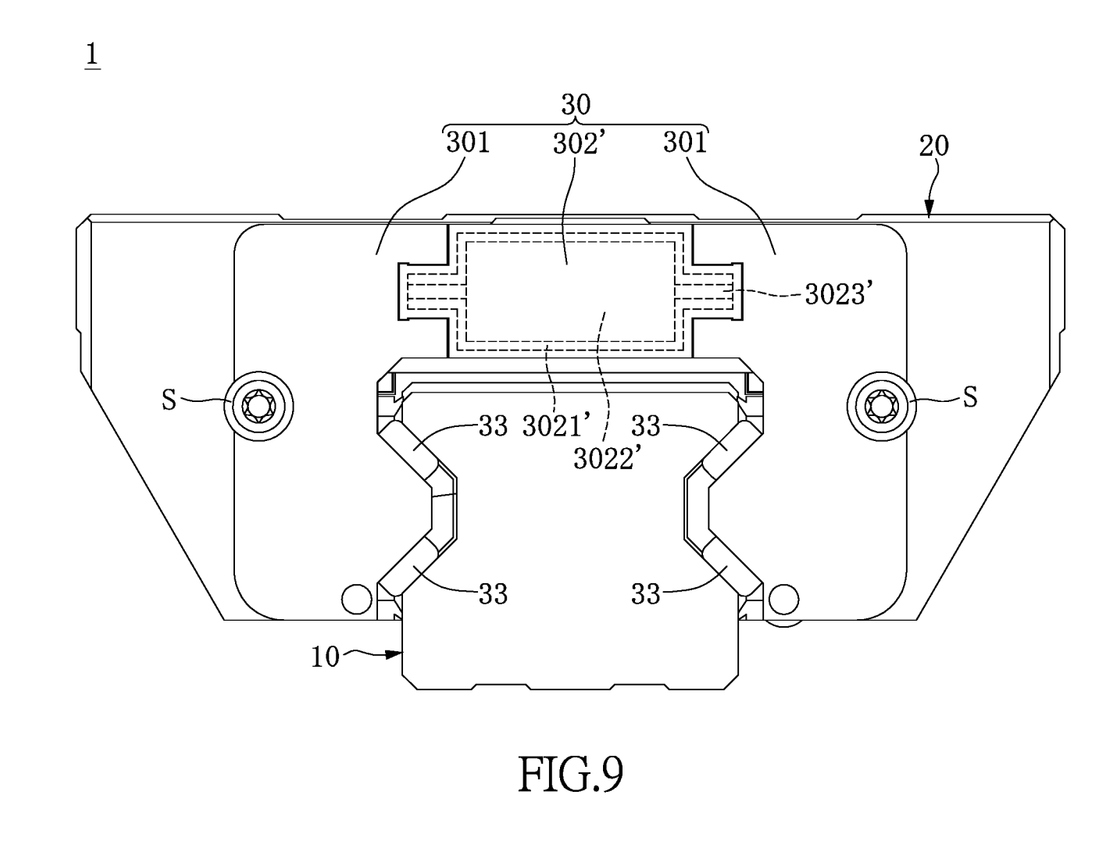
FIG. 9 illustrates a front view of a second embodiment of the instant disclosure.

Refer to FIG. 9, illustrating the second embodiment in the instant disclosure. The linear guideway 1 includes a guideway 10, a plurality of roll components, a slide block 20, and a self-lubricating assembly 30. The guideway 10, a plurality of roll components, slide block 20, and self-lubricating assembly 30 are roughly the same as the first embodiment. The difference between the second embodiment and the first embodiment is the connector of the self-lubricating assembly 30 is no longer the cotton rope. The connector in this embodiment is a housing element 302' instead. The connecting portions 312', 312" (as shown in FIG. 4) are engaged with the housing element 302'. More specifically, two ends of the housing element 302' have a projecting structure corresponding the recess structure of the connecting portions 312', 312" of the two oil containers 301, so the housing element 302' is engaged with the two oil containers 301. The shape of the portions contacting the two oil containers 301 of the housing element 302' could be modified as required and is not limited to the configuration shown in drawings.

Two ends of the housing element 302' are connected to the connecting portions of the two oil containers 301, and the interior of the housing element 302' is connected to the holding groove of the two oil containers 301. The lubricant of the oil container 301 flows into another oil container 301 through the housing element 302'. In other words, the housing element 302' in the second embodiment has the same function as the connector 302 of the first embodiment. The housing element 302' can adjust the volume of the lubricant absorbed by the two flexible lubricating elements 33 exposed from the oil container 301, so both sides of the guideway 10 are applied with average lubricant.

The interior of the housing element 302' is formed with an assisting groove 3021', and a hole (not shown) is formed between the housing element 302' and the two oil containers 301. At least an assisting absorber 3022' and two assisting connectors 3023' are disposed in the assisting groove 3021'. The shape of the assisting absorber 3022' is roughly corresponding to the shape of the assisting groove 3021' and disposed in the assisting groove 3021'. The two assisting connectors 3023' are disposed between the housing element 302' and the two oil containers 301.

The assisting absorber 3022' is used to suck the lubricant, the two assisting connectors 3023' are used to connect the absorber 3022' and the absorbers are disposed in two oil containers 301. The lubricant of one of the oil containers 301 flows into the absorber of another oil container 301 through the assisting connector 3023' and assisting absorber 3022'. In a preferable embodiment, two ends of each of the assisting connectors 3023 respectively contact the assisting absorber 3022' and absorber (not shown) of the oil container 301. The assisting absorber 3022' in this embodiment is integrated with the two assisting connectors 3023' as required.

What is claimed is:
1. A self-lubricating assembly for a linear guideway, comprising:
   at least two oil containers, each of the oil containers comprising:
      a body formed inward with a holding groove for reserving a lubricant, and the outside of the body formed with a rail contacting portion and a connecting portion;
      an absorber disposed inside the holding groove for sucking the lubricant; and
      a flexible lubricating element disposed in the rail contacting portion, and at least a part of the flexible lubricating element extended to the holding groove, and the flexible lubricating element utilized to suck the lubricant; and
   at least one connector connecting the connecting portions of the oil containers, so the lubricant flows between the two oil containers;
   wherein the connecting portions of the two oil containers are selectively connected the connector, and the diffusion velocity of the lubricant in the absorber is faster than the diffusion velocity of the lubricant in the flexible lubricating element.

2. The self-lubricating assembly for the linear guideway according to claim 1, wherein a position away from the rail contacting portion of the body of each of the oil containers is formed with an air vent, and the air vent is penetrated through the body, so the holding groove of the body is connected to the outside.

3. The self-lubricating assembly for the linear guideway according to claim 2, wherein each of the oil containers further comprises a cover, the holding groove of each of the oil containers is an exposed groove structure, the outside of the body is formed with a flange, and the flange surrounds the holding groove, the cover has a flue corresponding to the flange for sealing the holding groove.

4. The self-lubricating assembly for the linear guideway according to claim 3, wherein one side formed with the flue of the cover of the oil container is formed with a plurality of pillars, and the pillars of the cover correspond to a bending portion of the body when the cover is engaged with the body.

5. The self-lubricating assembly for the linear guideway according to claim 1, wherein at least a part of the flexible lubricating element is contacted with the absorber disposed in the holding groove, so the flexible lubricating element sucks the lubricant from the absorber.

6. The self-lubricating assembly for the linear guideway according to claim 5, wherein the connecting portions of the oil containers are two buckle structures, the oil containers are engaged to each other by the two buckle structures; the connecting portion of the body has a punch hole, and the connector passes through the punch hole of the oil container and disposed inside the two holding grooves, two ends of the connector contact the two absorbers disposed in the two holding grooves respectively to suck the lubricant from the holding groove.

7. The self-lubricating assembly for the linear guideway according to claim 5, wherein the connector is a housing element, the housing element is engaged with the connecting portion of the oil container, the housing element includes an assisting groove for accommodating the lubricant, at least one assisting absorber, and at least two assisting connectors, the lubricant flows through the two holding grooves and the assisting groove, the assisting absorber is used to suck the lubricant, the two assisting connectors are disposed in a portion that the housing element and the two oil containers are connected to, two ends of each of the assisting connectors are exposed to the assisting groove and the holding groove, each of the assisting connectors sucks the lubricant from the assisting groove and the holding groove.

8. A linear guideway, comprising:
   a guideway,
   a slide block linearly movable disposed on the guideway
   a plurality of roll components disposed in the slide block, so the slide block linearly movable along the guideway; and
   a self-lubricating assembly installed in one end of the slide block, and linearly movable along the guideway with the slide block, comprising:
      a body formed inward with a holding groove, the holding groove reserved for a lubricant, and outside of the body has a rail contacting portion and a connecting portion;
      an absorber disposed inside the holding groove for sucking the lubricant;
      a flexible lubricating element disposed in the rail contacting portion, and at least a part of the flexible lubricating element extended to the holding groove, and the flexible lubricating element utilized to suck the lubricant; and at least one connector connecting the connecting portions of oil containers, so the lubricant flows in the oil containers;

wherein the connecting portions of at least two oil containers are selectively connected with the connector, and the diffusion velocity of the lubricant in the absorber is faster than the diffusion velocity of the lubricant in the flexible lubricating element.

9. The linear guideway according to claim 8, wherein a position away from the rail contacting portion of the body of each of the oil containers is formed with an air vent, and the air vent is penetrated through the body, so the holding groove of the body is connected to the outside.

10. The linear guideway according to claim 9, wherein each of the oil containers further comprises a cover, the holding groove of each of the oil containers is an exposed groove structure, the outside of the body is formed with a flange, and the flange is surrounded by the holding groove, the cover has a flue corresponding to the flange for sealing the holding groove.

11. The linear guideway according to claim 10, wherein one side formed with the flue of the cover of the oil container is formed with a plurality of pillars, and the pillars of the cover correspond to a bending portion of the body when the cover is engaged with the body.

12. The linear guideway according to claim 8, wherein at least a part of the flexible lubricating element contacts the absorber disposed in the holding groove, so the flexible lubricating element is sucked by the lubricant from the absorber.

13. The linear guideway according to claim 12, wherein the connecting portions of the oil containers are two buckle structures, the oil containers are engaged to each other by the two buckle structures; the connecting portion of the body has a punch hole, and the connector is through the punch hole of each of the oil containers and disposed inside two holding grooves, two ends of the connector contacts two absorbers disposed in the two holding grooves respectively to suck the lubricant from the holding groove.

14. The linear guideway according to claim 12, wherein the connector is a housing element, the housing element is engaged with the connecting portion of the oil containers, the housing element includes an assisting groove for accommodating the lubricant, at least one assisting absorber, and at least two assisting connectors, the lubricant flows through two holding grooves and the assisting groove, the assisting absorber is used to suck the lubricant, the two assisting connectors are disposed in a portion that the housing element and two oil containers are connected, two ends of each of the assisting connectors are exposed to the assisting groove and the holding groove, each of the assisting connectors sucks the lubricant from the assisting groove and the holding groove.

* * * * *